United States Patent [19]

Zerrien, Jr. et al.

[11] Patent Number: 4,814,704
[45] Date of Patent: Mar. 21, 1989

[54] ROTOR POSITION INDICATOR WITH CORRECTION FOR APPARANT ACCELERATION AND DECELERATION

[75] Inventors: Donald W. Zerrien, Jr., Elgin; James W. Kopec, Winfield, both of Ill.

[73] Assignee: Motorola, Inc., Schaumburg, Ill.

[21] Appl. No.: 36,049

[22] Filed: Apr. 8, 1987

[51] Int. Cl.<sup>4</sup> .................. G01B 7/14; G01N 27/72; G01R 33/00; F02P 5/00

[52] U.S. Cl. .................. 324/208; 324/225; 123/416

[58] Field of Search ............... 324/207, 208, 225, 161, 324/166, 178, 179; 364/431.04, 431.07, 431.08, 431.03, 569; 123/416, 417, 418

[56] References Cited

U.S. PATENT DOCUMENTS

| | | | |
|---|---|---|---|
| 4,152,655 | 5/1979 | Przybyla et al. | 328/120 |
| 4,241,708 | 12/1980 | Javeri | 123/418 |
| 4,262,251 | 4/1981 | Fujishiro et al. | 324/208 |
| 4,321,580 | 3/1982 | Deleris | 340/870.24 |
| 4,338,813 | 7/1982 | Hunninghaus et al. | 73/116 |
| 4,338,903 | 7/1982 | Bolinger | 123/476 |
| 4,378,004 | 3/1983 | Petrie | 123/643 |
| 4,385,605 | 5/1983 | Petrie et al. | 123/414 |
| 4,485,784 | 12/1984 | Fuji et al. | 123/416 |
| 4,494,509 | 7/1985 | Long | 123/414 |
| 4,494,518 | 1/1985 | Katayama et al. | 123/612 |
| 4,553,208 | 11/1985 | Akiyama et al. | 364/431.05 |
| 4,572,151 | 2/1986 | Toyama | 123/622 |
| 4,626,682 | 12/1986 | Hars et al. | 250/231 SE |

Primary Examiner—Reinhard J. Eisenzopf
Assistant Examiner—Walter E. Snow
Attorney, Agent, or Firm—Robert J. Crawford

[57] ABSTRACT

In one aspect of the present invention, an angle measuring device is described for measuring the angle of a rotating rotor having a plurality of markings spaced thereabout. The device comprises: a sensor positioned adjacent the rotor for detecting the markings and generating a sensor signal in response thereto; an indicator device, responsive to the sensor signal, for generating a position signal indicative of the angular position of the rotor. Additionally, a timing circuit is used for measuring the time between contiguous sensor signals; and a comparator is used for comparing at least one of the measured times against at least one predetermined value and for generating a comparison output signal indicative thereof. Finally, a correction circuit is used, in response to the comparison output signal, for correcting the position signal to avoid inaccuracies due to such problems as unequal spacing between the markings.

17 Claims, 4 Drawing Sheets

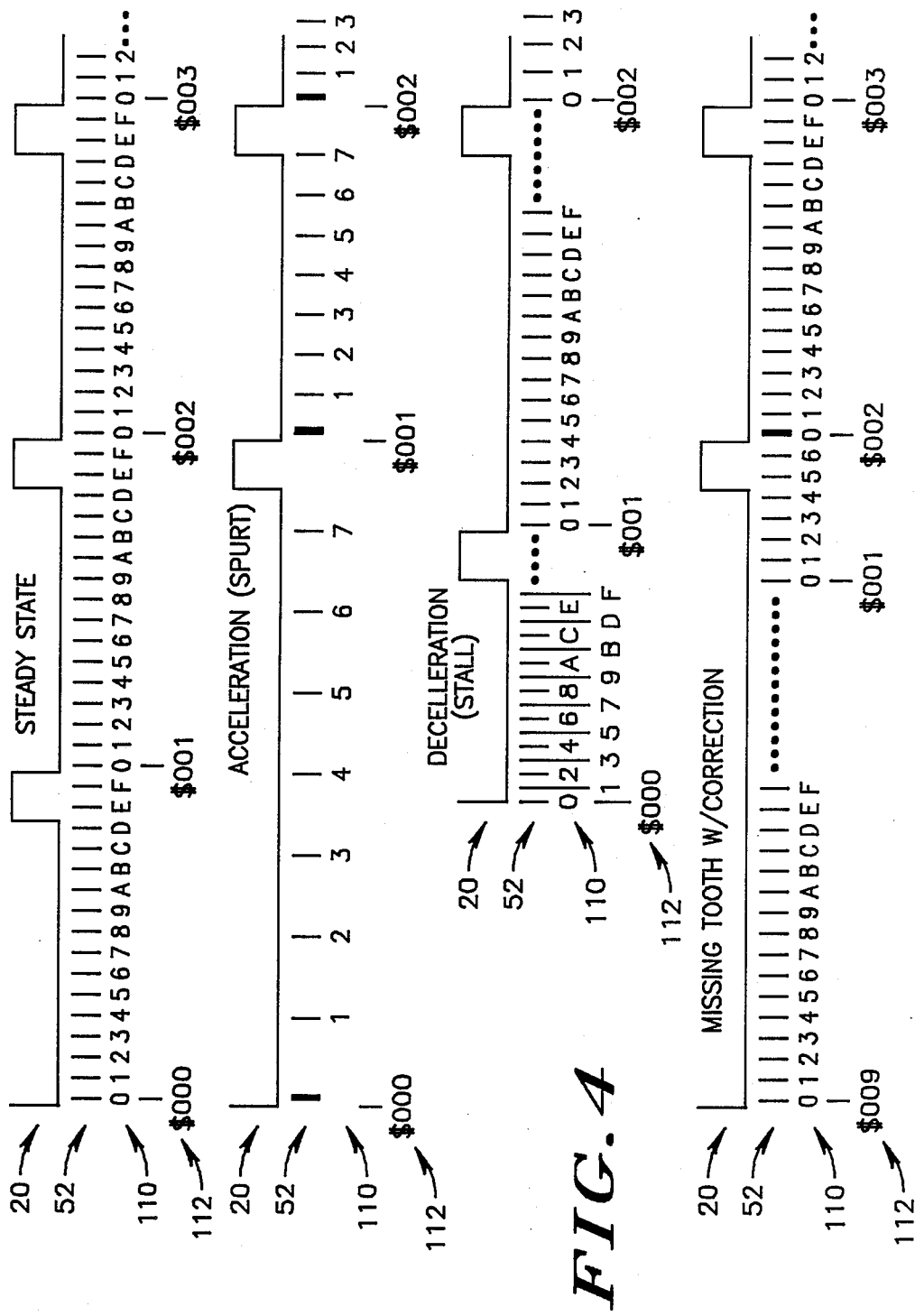

ROTOR POSITION INDICATOR WITH CORRECTION FOR APPARANT ACCELERATION AND DECELERATION

FIELD OF THE INVENTION

The present invention relates generally to angle counting systems, and, more particularly, to a circuit for counting and referencing angular positions on a rotating shaft.

DESCRIPTION OF THE PRIOR ART

Angle counting circuits are well known. For example, an angle counting circuit is sometimes used in a vehicle electronic ignition system to establish ignition timing. The ignition timing is typically generated by a sensor set up to detect the movement of teeth on the engine crankshaft. As the crankshaft rotates, the sensor determines the position of the crankshaft by counting the number of teeth that pass by. The spacing of the teeth along the periphery of the shaft allows the angle counting circuit to approximate, through interpolation, when a tooth will pass by the sensor. This type of approximation is particularly useful in the absence of a tooth as the timing the circuit generates is necessary at all times.

Unfortunately, there are problems relating to the position of the engine crankshaft that the above described circuit does not overcome. One problem involves the acceleration and deceleration of the crankshaft. As the crankshaft rotation accelerates, for example during power up or engine acceleration, such an interpolation is inaccurate due to the variance of the angle spacing over time. In this instance, the approximation would be ahead of the correct tooth position. As the the crankshaft rotation decelerates, for example during engine deceleration, such an interpolation is inaccurate as the approximation would be behind the correct tooth position.

Another problem involves the manufacture of the crankshaft itself. Since the teeth are not always equally positioned along the periphery of the crankshaft, an interpolation method based on the spacing between several of the teeth will not always provide an accurate approximation of a correct tooth position.

The importance of an accurate angle counting system is also recognized where a reliable future estimation of a shaft position is required. For example, in a fuel injection system, it is desirable to release fuel for a time period which is based on the ignition timing. This is typically accomplished by actuating a fuel pump solenoid for a fixed period of time. Since the solenoid takes some period of time to actuate, the solenoid should be actuated slightly ahead of the desired fuel release time. If this timing can be reliably estimated, independent of acceleration, deceleration or tooth spacing, the fuel efficiency can be significantly improved.

Accordingly, an angle counting system is needed which overcomes the aforementioned deficiencies.

SUMMARY OF THE INVENTION

It is an object of the present invention to provide an angle counting circuit for a rotating rotor whose output is substantially independent of acceleration or deceleration of the shaft.

It is an additional object of the present invention to provide an angle counting circuit for a rotating rotor whose output is substantially independent of spaced markings, or teeth, positioned on the rotor.

It is yet another object of the present invention to provide an angle counting system for a rotating rotor which can accurately estimate the future position of the rotor.

The present invention may briefly be described in terms of a preferred embodiment involving an engine crankshaft having teeth positioned about its periphery. The embodiment includes an angle measuring device for measuring the angle of the crankshaft relative to a reference position on the crankshaft. The device comprises: a sensor positioned adjacent the crankshaft for detecting the teeth and generating a sensor signal in response thereto; and an indicator device, responsive to the sensor signal, for generating a position signal indicative of the angular position of the crankshaft. Additionally, a timing circuit is used for measuring the time between contiguous sensor signals, and a comparator is used for comparing at least one of the measured times against at least one predetermined value and for generating a comparison output signal indicative thereof. Also, a correction circuit is used, in response to the comparison output signal, for correcting the present position signal. The correction circuit includes a spurting and stalling mechanism to ensure that the present position signal is substantially synchronized to the position of the crankshaft.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in which like reference numerals identify like elements, and wherein:

FIG. 4 illustrates four timing diagrams depicting the counting operation at the output of the circuit shown in FIGS. 2 and 3.

DETAILED DESCRIPTION OF THE PREFERRED EMBODIMENT

Figure 1:
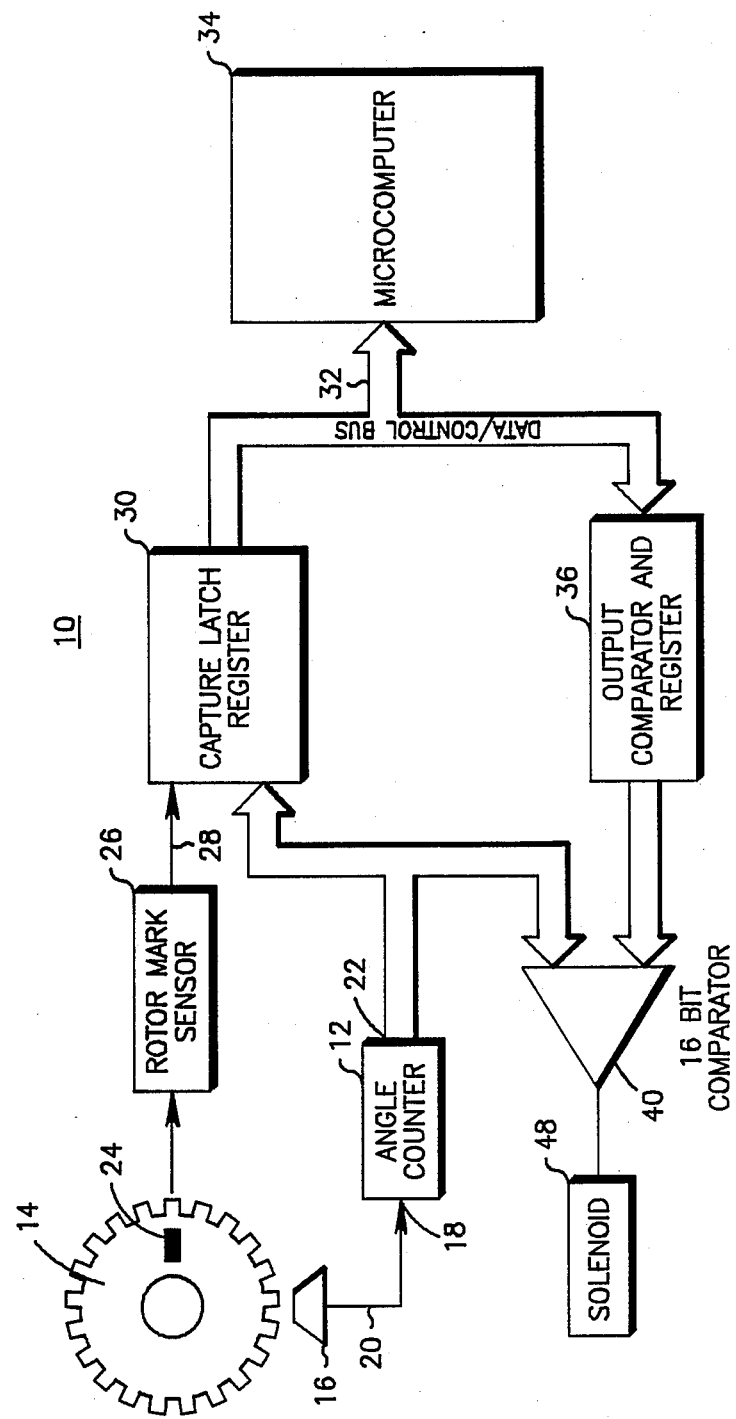
FIG. 1 is a block diagram of a system for estimating the future or present position of a rotating rotor, particularly an engine crankshaft, according to the present invention.

In FIG. 1, a synchronous angle counting system 10 is shown which is designed to correlate the physical angle, or position, of a geared rotor (wheel) 14, such as an engine flywheel, with an external event. The angle counter 12 is a primary element in the system 10 and may be used with the surrounding circuitry depicted in FIG. 1 to predict precise angular positions of the rotor for external events. For example, when the system is used for engine ignition timing, the system may be used to actuate a fuel pump solenoid 48 at a precise top-dead-center (TDC) ignition position. Since the solenoid 48 takes a finite amount of time to inject the fuel, a microcomputer 34 can determine the representative angle at which the solenoid 48 should be actuated.

The microcomputer 34 accomplishes this estimation by preloading an output compare register 36 with this predicted angle so that when the angle counter 12 indicates the precise angle, the solenoid 48 will be actuated at the exact time needed to inject the fuel at a TDC position. As mentioned previously, such control is extremely beneficial as it may be used to improve the fuel efficiency and/or the general operation of the engine. A detailed description of the system 10 is now described having the angle counter 12 as a focal point.

The angle counter 12 utilizes a sensor 16 connected to its input port 18 for generating a tooth edge signal 20 at the output of the sensor 16, consisting of a brief high pulse, at each occurrence (passing) of a tooth or similar type of marking on the rotor 14. An output port 22 of the angle counter 12 is used to provide a 16 bit value corresponding to a relative position on (or relative angle measurement of) the rotor 14. The 16 bit value is a modulo value which incrementally counts up to a number substantially greater than the number of teeth on the rotor 14. It will be discussed in more detail below.

The 16 bit value output by the angle counter 12 is coupled to a capture latch register 30 and a 16 bit comparator 40. The capture latch register 30 receives the 16 bit value whenever a preselected external input event occurs. The latched values are called "angular input capture counts." Preferably, the 16 bit value is latched at each occurrence of a reference position indicating absolute angular position of the rotor (or crankshaft). In FIG. 1, this reference position is a rotor mark 24 on the rotor 14 and is detected by a rotor mark sensor 26, similar to ones used in automotive applications for a crankshaft, to generate a pulsed signal 28 for the capture latch register 30 each time the mark 24 is detected. The pulsed signal 28 then latches the 16 bit value, representing the angular position of the rotor 14, into the capture latch register 30 once per revolution of the rotor 14. By latching the 16 bit value once per revolution, the system 10 may reliably estimate future positions of the rotor 14 according to future 16 bit values output from the angle counter 12.

For example, if the most recent 16 bit value latched into the capture latch register 10, by the rotor mark sensor 26, was 194.125 (decimal) and the solenoid 48 should be activated at 4.25 teeth after the most recent latching of the 16 bit value, the microcomputer 34 would store 198.375 (194.125+4.25) in the output compare register 36. When the 16 bit value output by angle counter 12 equals 198.375, the solenoid is activated.

More particularly, the 16 bit value is coupled to the 16 bit comparator 40 so that when the value corresponds to a certain angle relative to the value when the mark 24 was present, external events may be actuated according to the programming of the microcomputer 34. This is accomplished through coordination of the microcomputer 34 as described below.

The microcomputer 34 is connected to the capture latch register 30 and an output compare register 36 through the microcomputer's data and control bus 32. The microcomputer 34 employs these registers to accurately estimate the position of the rotor 14 based on previously input angular input capture counts. The 16 bit value most recently input into the capture latch register 30 is used as a reference to determine the physical angle of the rotor at a later time. Any future angular position of the rotor may then be predicted by the microcomputer by adding a predetermined number to the angular input capture count and storing the sum in the output compare register 36.

The output compare register 36 is preloaded by the microcomputer 34 with this sum to represent a future position of the rotor 14. When the output of the angle counter 12 reaches (equals) this preloaded sum, the 16 bit comparator, receiving the 16 bit value from the angle counter 12 and the 16 bit output from the output compare register 36, triggers an external event (such as the fuel pump injection control described above) by actuating the solenoid 48. The preloaded values are referred to as "angular output compare counts". Thus, the angle counter 12 may be used to estimate precise angular locations of the rotor 14 such that the microcomputer, in conjunction with the 16 bit comparator, can trigger external events in a predictive manner.

The 16 bit value output from the angle counter 12 is broken into two parts. The first part comprises 12 bits and is called the "integer" part, while the second part, comprising the remaining four bits, is called the "fractional" part. The integer part is incremented once for each incoming gear tooth. The fractional part is incremented at evenly spaced time intervals determined by the period (the time period between the occurrence of two teeth as sensed by the gear tooth sensor) between the previous two gear teeth, and all increments are evenly spaced provided that the current tooth period is exactly equal to the previous tooth period. Under steady state operation with equal tooth spacing, the total number of counts in the fractional part between gear teeth would cause the fraction to rollover from a maximum value to zero precisely when the integer increments by 1. Under all other nonsteady state conditions, the system guarantees that after a brief period after each incoming gear tooth, the integer will be incremented by 1 and the fraction will be rolled over to zero. Thus, the two parts of the counter act as one, where the integer part represents the most significant counter bits, and the fractional part represents the least significant counter bits.

This two part counter system allows adjustments to the counting process when adverse operating conditions are encountered. Under acceleration or uneven tooth spacing, where a smaller period follows a larger period, the fractional part will not be ready to rollover when the next gear tooth passes. Thus, a provision is made for very fast incrementing of the counter which allows correction to the 16 bit value by forcing the counter to "spurt" ahead.

Conversely, under deceleration or uneven tooth spacing, where a larger period follows a smaller period, the "fractional" part would have been ready to rollover sometime before the next gear tooth passes. Thus another provision is made to correct the 16 bit value by "stalling" the counter until the next gear tooth comes by.

The stalling condition requires additional monitoring. If the stalled count is found to be greater than that which can be due to deceleration or uneven tooth spacings, a missing tooth can be assumed "detected". Since the absence of a tooth requires that the integer part of the 16 bit value be incremented, correction to the counter is required.

This is accomplished by allowing the counter to increment at its previous rate until it reaches the value indicating the absence of a tooth. At this point, the integer part is incremented to indicate that the tooth should have been present, and the fractional part of the 16 bit value is released from the stalled condition. If the value represented by the fractional part is less than the number of counts between the previous tooth period, the "spurt" feature will allow the counter to return to its proper value at the presence of the next gear tooth. To keep the counting rate representative of the rotor rotating velocity, the counting rate is changed only after two actual gear teeth pass following the detection of a missing tooth.

Although there are many ways to implement the "spurt", "stall", "detection", and "correction" features described above, the circuit in FIGS. 2 and 3 describes the preferred implementation. More particularly, FIGS. 2 and 3 illustrate the angle counter 12, of FIG. 1, in expanded form.

Figure 2:
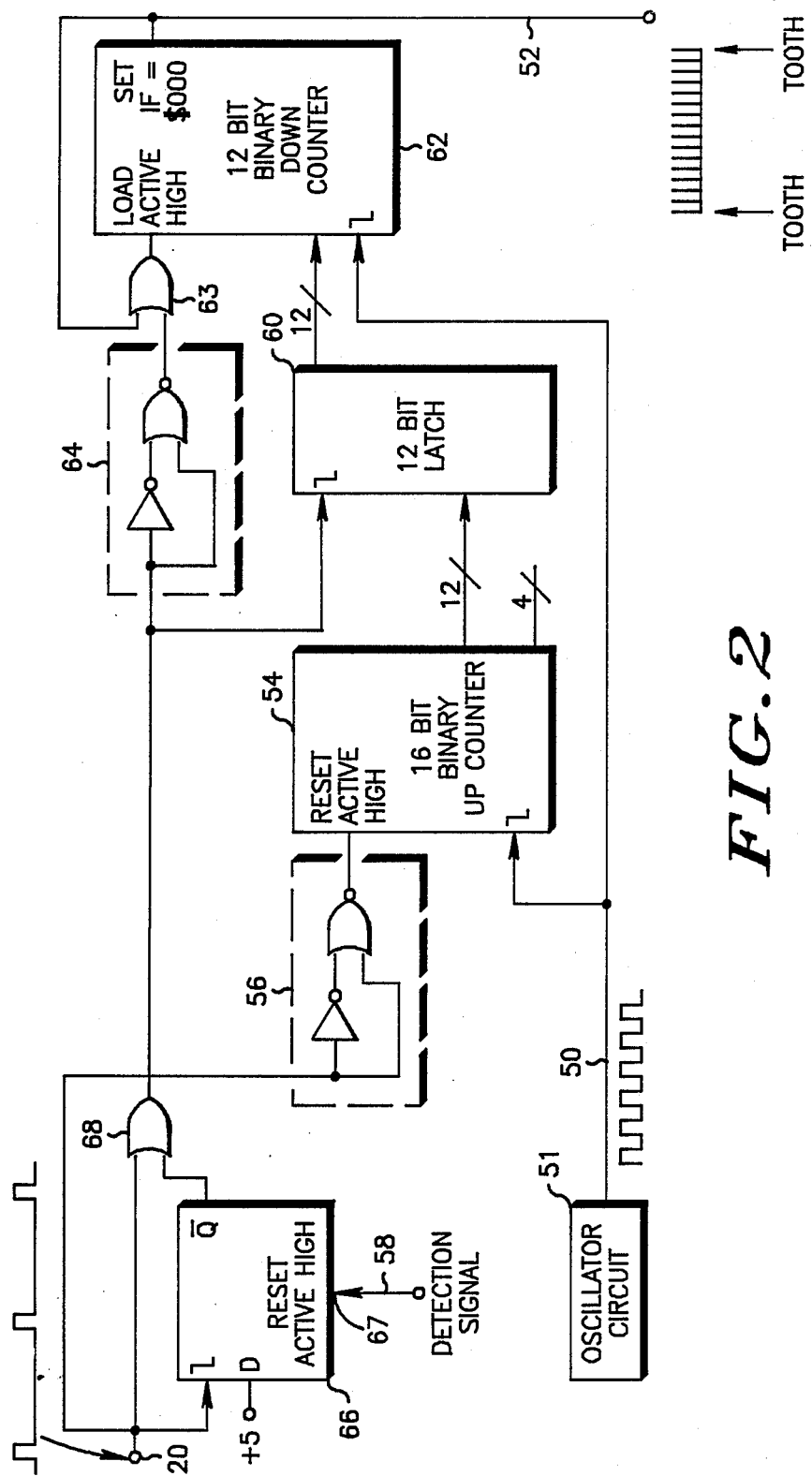
FIGS. 2 and 3 comprise a circuit diagram, according to the present invention, for implementing block 12 of FIG. 1.
Figure 3:
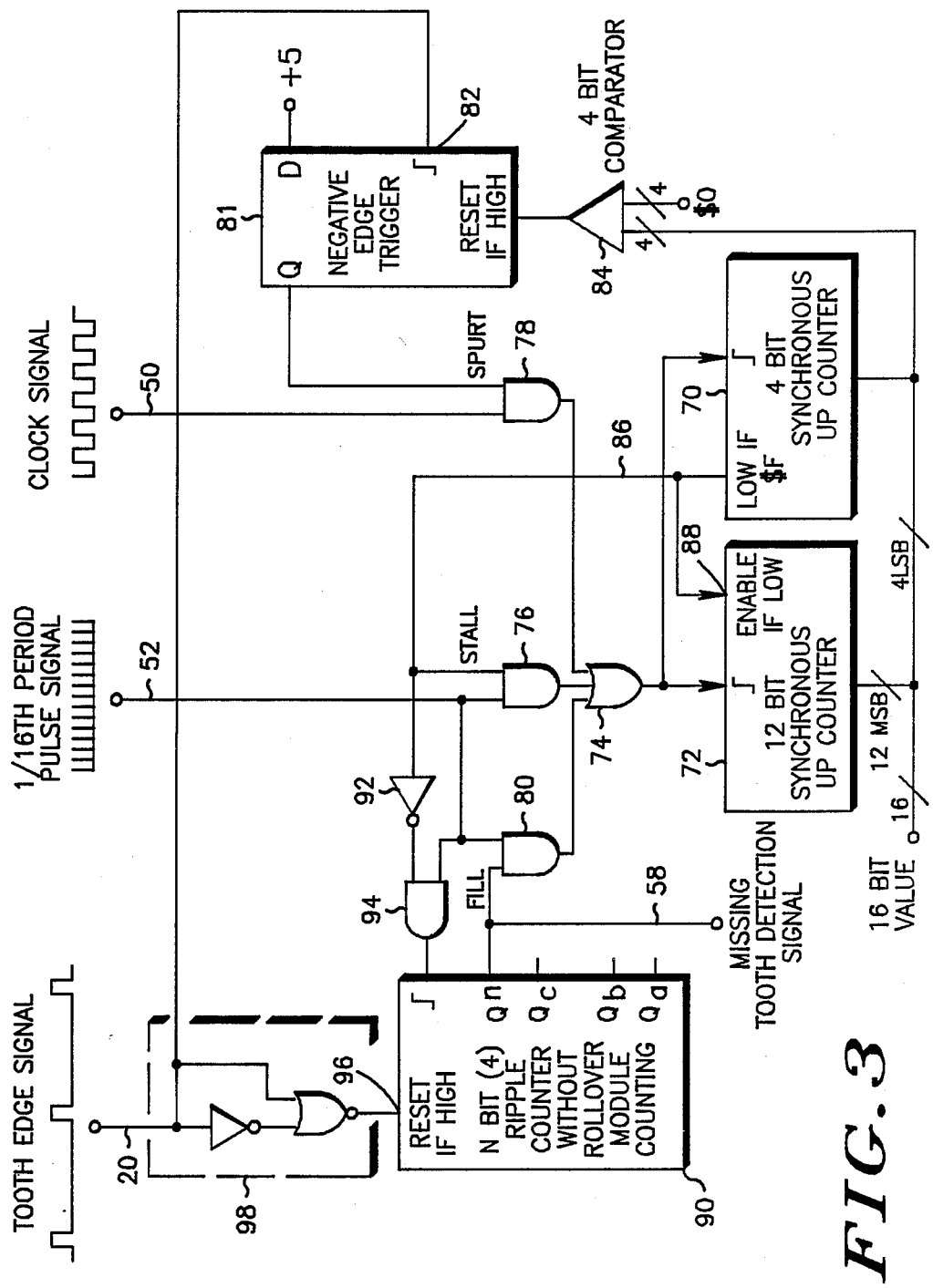

In FIG. 2 the tooth edge signal 20, generated for each passing rotor tooth, is combined with a high speed clock signal 50 (4.0 MHz), generated from an oscillator circuit 51, to produce an output signal 52 that pulses 16 times for every incoming gear tooth period. The output signal 52 is used to interpolate the angle between teeth and to establish the basic counting operation for the 16 bit value discussed above. The tooth edge signal 20 is represented by a negative going pulse which occurs coincident with the geometric center of each passing gear tooth.

On every occurrence of the tooth edge signal 20, a 16 bit up counter 54 is reset (cleared). This is accomplished by coupling the tooth edge signal 20 to the 16 bit up counter 54 through a negative edge detector circuit 56. The 16 bit up counter 54 is then incremented by the high speed clock signal 50 during the period between gear teeth. After two consecutive tooth edge signals 20 without a missing tooth detection signal 58, subsequently discussed, the integer part (12 most significant bits) of the 16 bit up counter 54 are latched into a 12 bit latch 60, prior to the next clearing of the 16 bit up counter. The 12 bit latched value is then transferred to a 12 bit down counter 62 and decremented by the clock signal 50 to zero.

The latched 12 bit value is loaded into the 12 bit down counter 62 at one of three occurrences. The first occurrence is at the negative going edge of the tooth edge signal 20. This is the result of another negative edge detector circuit 64 coupling the tooth edge signal 20 to the LOAD input of the counter 62 through an OR gate 63. This "load" ensures that the down counting performed by the counter 62 is reinitialized after every detection of a tooth on the rotor 14.

The second occurrence is when a missing tooth is detected. This is the result of a D flip-flop 66 and an OR gate 68 coupled to the edge detector circuit 64, subsequently discussed. This "load" ensures that when a missing tooth is detected, the circuit in FIG. 2 will act as though the tooth was actually present. Hence, the down counting performed by the counter 62 is reinitialized after every "effective" detection of a tooth on the rotor 14.

The last occurrence, and probably the most frequent, is when the output signal 52 is generated. The output signal 52 is generated when the fractional part of the 16 bit value reaches zero. This accomplished by coupling the output signal 52 provided by the counter 62 to its LOAD input through the OR gate 63. Decrementing the 12 bit latched value to zero will take 1/16th the time it took to increment the entire 16 bit quantity to its maximal value. Hence, this "load" ensures that counter 62 will reinitialize its down counting after every generation of the output signal 52 so as to establish equal periods between the output signals 52.

The number of pulses appearing at the output signal 52 since the most recent tooth edge signal 20 (the current tooth period) is dependent upon the previous tooth period. In fact, the output signal 52 has special characteristics depending on the relation between the previous and current tooth periods. If the current tooth period is less than the previous tooth period, less than 16 pulses will occur. If the current tooth period is greater than the previous tooth period, 16 or more pulses will occur. This applies to cases having even the slightest deviation between gear tooth periods. This is because the 16th down counting action of the 12 bit counter to zero occurs nearly coincident with the next tooth active edge. If the current tooth period is shortened even by the smallest amount, the output signal 52 will be missed. The difficulty in producing an equal number of pulses per tooth period is overcome by employing the circuit shown in FIG. 3.

Referring now to FIG. 3, the circuit combines the high speed clock signal 50 (from the oscillator circuit 51 in FIG. 2), the tooth edge signal 20, and the output signal 52 (the interpolation output provided by the circuit in FIG. 2) to produce the 16 bit value at the output port 22 of the angle counter 12 (FIG. 1).

In FIG. 3, the 16 bit value is generated by a 4 bit up counter 70 which represents the "fractional" part, and a 12 bit up counter 72 which represents the "integer" part, previously discussed. The 16 bit value can be incremented by only two sources, by either the output signal 52 or the high speed clock signal 50. Both signals 50 and 52 are coupled to the counters 70 and 72 through a 3-input OR gate 74. The output signal 52 is coupled to the OR gate 74 through a first AND gate 76, while the clock signal 50 is coupled through a second AND gate 78. Additionally, a third AND gate 80 is used to couple the output signal 52 in combination with a missing tooth detect signal 58, subsequently described, through the OR gate 74 to the counters 70 and 72.

The counters 70 and 72 begin at some random value. If the "fraction", output from counter 70, is not equal to a hexidecimal zero ($0), then after the next tooth edge signal 20 the counter 70 will be incremented until it rolls over to zero. This is accomplished through the use of a D flip flop 81 in combination with the clock signal 50.

The D flip flop 81 is coupled to the tooth edge signal at its (negative edge triggered) clock input port 82 such that it generates a high-level output signal, indicating the occurrence of the tooth edge signal, until the counter 70 produces a $0 output, at which time the D flip flop 81 is reset by a 4 bit comparator 84 detecting this condition. This high speed incrementing operation is referred to as the "spurting" action, discussed previously.

This spurting action continues until the 12 bit "integer" part increments by 1, and the 4 bit "fractional" part rolls over to zero. The rollover action by the counters 70 and 72 is accomplished by the conventional technique of connecting a $F detect signal 86 (active low) from the counter 70 to an enable input port 88 of the counter 72. In essence, the spurting action ensures that the counter 70 returns to $0 and that the counter 72 increments by one after each tooth edge signal 20.

The output signal 52 should then be valid after the 2nd tooth active edge following power up, assuming a minimum rotor velocity. Based on the structure shown in FIG. 2, the first pulse of the output signal 52 is spaced 1/16th of the previous period from the most recent tooth active edge. The output signal 52 will increment the counter 70 at this 1/16th period interval until the "fractional" part of the 16 bit value reaches $F. At this point the angle counter 12 enters a "stall" condition.

The stall condition is accomplished by connecting the $F detect output signal 86 to an input of the AND gate 76, thereby blocking any additional increments to the counter 70 by the output signal 52. When the stall condition begins, the high speed clock signal 50 is inhibited from incrementing the counters 70 and 72. However, at the next occurrence of the tooth edge signal 20, the counters 70 and 72 will be quickly incremented by the high speed clock signal 50 to compensate for the extending tooth period.

When in the stalled condition (before the next tooth edge signal 20), a missing tooth detection up counter 90 begins to increment for each incoming output signal 52. This is accomplished by inverting the $F detect signal 86 through a gate 92 and coupling it to an input of an AND gate 94. The other input of the AND gate 94 receives the output signal 52 such that only after the stall condition is detected does the counter 90 begin counting pulses of the output signal 52. The counter 90 is a 4 bit counter configured such that it does not rollover in a modulo roll-over manner. Thus, once the detection signal 58 is activated, it remains activated until the counter 90 is reset.

A reset input port 96 of the counter 90 receives the tooth edge signal 20 through another negative edge detection circuit 98. This allows the counter 90 to be cleared (reset) after each tooth edge signal 20. If the absence of the tooth edge signal 20 allows the counter to become incremented to a high enough level where decelerations can be discounted, in this case the level is $8, a missing tooth is assumed to be detected, and a detection signal 58 is generated which remains high until after the next tooth edge signal 20.

During the period the detection signal 58 remains high, correction of the 16 bit value is implemented. Initial correction is made by allowing the output signal 52 to increment the counters 70 and 72, through the AND gate 80 and the OR gate 74. The count at the output of counters 70 and 72 is now proceeding at a rate determined as the previous rate minus the value representing the detection criteria, i.e., the previous rate minus $8 counts. Then at the next occurrence of the tooth edge signal 20, the count returns to the proper value by "spurting" ahead such that the integer part of the value is equal to $0.

Referring once again to FIG. 2, the final phase of missing tooth "correction" involves updating the output signal 52 only after the 2nd tooth active edge following the detection of the missing tooth. This is accomplished by using the D flip flop 66 in conjunction with the OR gate 68; the detection signal 58 is connected to a RESET input port 67 of the D flip flop 66, and the inverted Q output is OR'd with the tooth edge signal 20 at OR gate 68. As discussed previously, the detection signal 58 remains high from the point of detection until after the next (first) tooth edge signal 20 is generated. Since the detection signal 58 is applied to the RESET input port 67 of the D flip flop 66, the inverted Q output and the output of the OR gate 68 are also forced high from the point of detection until after the first occurrence of the tooth edge signal 20. At the second occurrence of the tooth edge signal 20 and on its negative edge, the inverted Q output of the D flip flop 66 and the output of the OR gate 68 both change to the low state. Since this edge is the edge which causes the immediate latching of the top 12 bits of the up counter 54 into the 12 bit latch 60, and also the immediate reset of the up counter 54, the 12 bits must be latched into the latch 60 prior to resetting the up counter 54. This requires that the propagation delay for the D flip flop 66 plus the propagation delay of the OR gate 68 be less than the delay required to reset the up counter 54.

Once the inverted Q output of the D flip flop 66 returns low, a new period measurement will be latched with each incoming tooth edge signal 20.

To summarize, a set of timing diagrams are provided in FIG. 4. These diagrams describe the incrementing process of the angle counter 12 under:

(A) Normal operation;

(B) Acceleration with count "spurting", i.e., a long tooth period followed by a short tooth period;

(C) Deceleration with count "stalling", i.e., a short tooth period followed by a long tooth period; and (D) Missing tooth "detection" and "correction" under steady state conditions.

In each diagram the output signal 52 is depicted underneath the tooth edge signal 20. Underneath the output signal 52 of each timing diagram, two rows of hexidecimal numbers 110 and 112 illustrate the counting operation of the 16 bit value; the upper row 110 illustrates the fractional part, while the lower row 112 illustrates the integer part. Additionally, the thick dot-like symbols indicate counts during the stall operation, and the thick pulse-like symbols indicate the spurting action via the high speed clock signal 50.

The present invention therefore provides an angle counter which may synchronized to a rotating shaft. The angle counter operates independent of any microprocessor controls, but, as previously discussed, may be advantageously used with a microprocessor to predict precise positions of the rotor for actuating external events independent of accelerations, decelerations or abnormal tooth spacings in the wheel.

While the invention has been particularly shown and described with reference to a preferred embodiment, it will be understood by those skilled in the art that various other modifications and changes may be made to the present invention described above without departing from the spirit and scope thereof.

What is claimed is:

1. In a system for measuring the angle of a rotating rotor having a reference position and a plurality of markings spaced about the rotor, an angle measuring device for indicating the position of the rotor relative to the reference position, comprising:

sensor means for detecting the rotor markings and generating a sensor signal in response thereto; and indicator means, responsive to said sensor signal, for generating a position signal indicative of the angular position of the rotor relative to the reference position, said indicator means including means for correcting to force said position signal to count to a predetermined maximum number between adjacent sensor signals.

2. An angle measuring device for measuring the angle of a rotating rotor, according to claim 1, wherein said correction means includes means for forcing said position signal to stall.

3. An angle measuring device for measuring the angle of a rotating rotor, according to claim 1, wherein said indicator means includes means for measuring the time between sensor signals and comparison means for comparing at least one of said measured times against at least one predetermined value and wherein said correction means is responsive to said comparison means.

4. An angle measuring device for measuring the angle of a rotating rotor, according to claim 1, wherein said position signal is a binary value which is capable of reaching a number substantially greater than the number of markings on the rotor.

5. An angle measuring device for measuring the angle of a rotating rotor, according to claim 4, wherein said binary value comprises an integer part and a fractional part.

6. An angle measuring device for measuring the angle of a rotating rotor, according to claim 5, wherein said correction means includes means for stalling the fractional part of the binary value until another sensor signal is generated by the sensor means.

7. An angle measuring device for measuring the angle of a rotating rotor, according to claim 5, wherein said correction means includes means for spurting the fractional part of the binary value until the integer part of the binary value is incremented.

8. An angle measuring device for measuring the angle of a rotating rotor, according to claim 1, wherein said indicator means further includes:
timing means for measuring the time between said sensor signals, and
interpolation means, responsive to said time measured between said sensor signals, for generating a signal indicative of the relative angular position between sensor signals;
wherein said correction means is responsive to said interpolation means.

9. In a system for measuring the angle of a rotating rotor having a reference position and a plurality of markings spaced about the rotor, an angle measuring device for indicating the position of the rotor relative to the reference position, comprising:
sensor means for detecting the rotor markings and generating a sensor signal in response thereto;
indicator means, responsive to said sensor signal, for generating a position signal indicative of the angular position of the rotor relative to the reference position, said indicator means including means for correcting said position signal in response to each sensor signal; and
wherein said correction means includes means for forcing said position signal to stall.

10. An angle measuring device for measuring the angle of a rotating rotor, according to claim 9, wherein said correction means includes means for forcing said position signal to spurt ahead.

11. In a system for measuring the angle of a rotating rotor having a reference position and a plurality of markings spaced about the rotor, an angle measuring device for indicating the position of the rotor relative to the reference position, comprising:
sensor means for detecting the rotor markings and generating a sensor signal in response thereto;
indicator means, responsive to said sensor signal, for generating a position signal indicative of the angular position of the rotor relative to the reference position, said indicator means including means for correcting said position signal in response to each sensor signal; and
wherein said indicator means includes means for measuring the time between sensor signals and comparison means for comparing at least one of said measured times against at least one predetermined value and wherein said correction means is responsive to said comparison means.

12. An angle measuring device for measuring the angle of a rotating rotor, according to claim 11, wherein said at least one predetermined value includes a value representative of a time period after which a sensor signal is expected.

13. An angle measuring device for measuring the angle of a rotating rotor, according to claim 11, wherein said at least one predetermined value includes a value representative of a previously measured time between sensor signals.

14. An arrangement for actuating an external event in a predictive manner according to the angular position of a rotating rotor having a plurality of spaced markings thereon, the arrangement comprising:
first sensor means for generating a reference signal indicative of a reference position of the rotor;
second sensor means for detecting the markings and generating a sensor signal in response thereto;
indicator means, responsive to said sensor signal, for generating a present position signal indicative, at least in part, of the relative number of markings, and including correction means for correcting said position signal by appropriately spurting and stalling the position signal in response to each sensor signal;
calculation means, responsive to said present position signal and said reference signal, for calculating a position signal indicative of a future predetermined position of the rotor;
means, responsive to said present position signal and said calculated position signal, for actuating the external event when said present position signal indicates that the present position of the rotor is equal to the predetermined position of the rotor.

15. An arrangement for actuating an external event in a predictive manner, according to claim 14, wherein said indicator means includes means to record the present position signal when the reference signal is generated.

16. An arrangement for actuating an external event in a predictive manner, according to claim 14, wherein said present position signal is further indicative of the time period between two of said markings.

17. An arrangement for actuating an external event in a predictive manner according to the angular position of a rotating rotor having a plurality of spaced markings thereon, the arrangement comprising:
first sensor means for generating a reference signal indicative of the position of the rotor;
second sensor means for detecting the markings and generating a sensor signal in response thereto;
indicator means, responsive to said sensor signal, for generating a present position signal indicative, at least in part, of the relative number of markings detected by said second sensor, said indicator means including:
interpolation means, responsive to said sensor signals, for indicating of the relative angular position between sensor signals, and
correction means, responsive to said interpolation means and to said sensor signals, for correcting said position signal by appropriately spurting and stalling the position signal;
calculation means, responsive to said present position signal and said reference signal, for calculating a position signal indicative of a future predetermined position of the rotor;
means, responsive to said present position signal and said calculated position signal, for actuating the external event when said present position signal indicates that the present position of the rotor is equal to the predetermined position of the rotor.

* * * * *